(12) United States Patent  
Xiao et al.

(10) Patent No.: US 8,420,259 B2
(45) Date of Patent: Apr. 16, 2013

(54) ELECTRODES INCLUDING AN EMBEDDED COMPRESSIBLE OR SHAPE CHANGING COMPONENT

(75) Inventors: Xinran Xiao, Okemos, MI (US); Adam T Timmons, Royal Oak, MI (US); Hamid G. Kia, Bloomfield Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 611 days.

(21) Appl. No.: 12/578,774

(22) Filed: Oct. 14, 2009

(65) Prior Publication Data

US 2011/0086294 A1 Apr. 14, 2011

(51) Int. Cl.
*H01M 4/38* (2006.01)
(52) U.S. Cl.
USPC ........... 429/209; 429/221; 429/223; 429/224; 429/231.3; 429/231.95
(58) Field of Classification Search .................. 429/209, 429/223, 224, 221, 231.3, 231.95
See application file for complete search history.

(56) References Cited

U.S. PATENT DOCUMENTS

| | | | |
|---|---|---|---|
| 5,736,275 | A | 4/1998 | Kaun |
| 5,814,734 | A | 9/1998 | Chang et al. |
| 5,910,382 | A | 6/1999 | Goodenough et al. |
| 6,200,548 | B1 | 3/2001 | Bichon et al. |
| 6,605,390 | B1 | 8/2003 | Moore et al. |
| 7,008,722 | B2 | 3/2006 | Huang |
| 7,105,141 | B2 | 9/2006 | Walker et al. |
| 2009/0305103 | A1* | 12/2009 | Takekawa et al. .............. 429/30 |
| 2011/0123866 | A1* | 5/2011 | Pan et al. ...................... 429/221 |

OTHER PUBLICATIONS

Sony's New Nexelion Hybrid Lithium Ion Batteries to Have Thirty-Percent More Capacity Than Conventional Offering. Industry's First Tin-Based Anode Battery to be Initially Used With Handycam Camcorders. Jul. 23, 2008. pp. 1-3.
Cavalier Francesca. Stable polymeric microballoons as multifunctional device for biomedical uses: Synthesis and characterization. Langmuir (Journal). 2005. pp. 8758-8764. 33 ref. vol. 21, ISSN 0743-7463. CODEN LANGD5 American Chemical Society, Washington, DC.
Edinburgh. MTL Expands its Range of Silver Coated Products. Online article (Microshphere Technology). Aug. 2008.

* cited by examiner

*Primary Examiner* — Jane Rhee
(74) *Attorney, Agent, or Firm* — BrooksGroup

(57) ABSTRACT

One exemplary embodiment includes an electrode including an embedded compressible or shape changing component.

19 Claims, 1 Drawing Sheet

ELECTRODES INCLUDING AN EMBEDDED COMPRESSIBLE OR SHAPE CHANGING COMPONENT

TECHNICAL FIELD

The field to which the disclosure generally relates to includes electrodes including an embedded compressible or shape changing component, products containing the same and methods of making and using the same.

BACKGROUND

Electrodes have been used in a variety of applications such as, but not limited to, lithium-ion batteries and fuel cells.

SUMMARY OF EXEMPLARY EMBODIMENTS OF THE INVENTION

One exemplary embodiment includes an electrode including an embedded compressible or shape changing component constructed and arranged to reduce in size or change shape upon insertion of lithium into the electrode.

Another exemplary embodiment includes a product including an electrode comprising an active material for storing lithium, and electrically conductive microballoons.

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein.

DETAILED DESCRIPTION OF EXEMPLARY EMBODIMENTS

The following description of the embodiment(s) is merely exemplary (illustrative) in nature and is in no way intended to limit the invention, its application, or uses.

One embodiment of the invention includes an electrode including an embedded compressible or shape changing component constructed and arranged to reduce in size or change shape upon insertion of lithium into the electrode thereby reducing electrode expansion. Such component may include, but is not limited to, electrically conductive microballoons. The electrode may be used in a variety of applications including, but not limited to, lithium-ion batteries and fuel cells.

Figure 1:
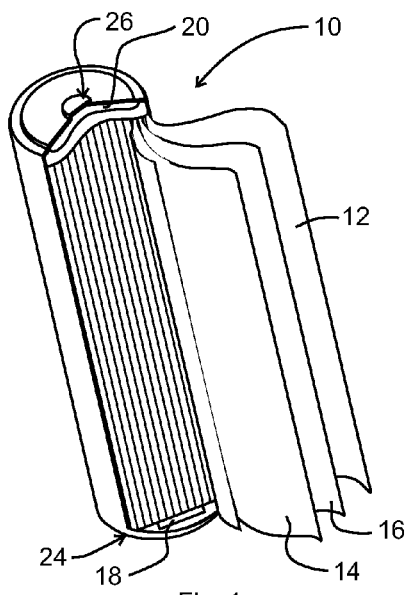
FIG. 1 is a sectional view with portions broken away of one embodiment of a lithium-ion battery in a cylindrical can according to one exemplary embodiment.

FIG. 1 illustrates one exemplary embodiment of a lithium-ion battery 10 having portions removed and inner portions exposed. The lithium-ion battery 10 may include a negative electrode 12 and a positive electrode 14 separated by a separator 16. A negative electrode tab 18 may be connected to the negative electrode 12 and a positive electrode tab 20 may be connected to the positive electrode 14. The negative electrode 12, separator 16, and positive electrode 14 may be carried in a battery housing 22 such as a steel can having a negative terminal 24 in contact with the negative electrode tab 18, and a positive terminal 26 in contact with the positive electrode tab 20. Such batteries may include an electrolyte in the form of a liquid or gel.

The negative electrode 12 and positive electrode 14 typically are very close to each other with a separator 16 preventing contact and possible short circuit. When the battery is connected to a load, such as a motor, ionized elements in the negative electrode 12 which include lithium migrate to the opposite electrode, the positive electrode 14. The ions (lithium) move through the electrolyte and the separator 16. The ions arriving at the positive electrode 14 combine with electrons originating from the negative electrode. Electrons flow through the external circuit, including the load. During recharging, current is forced into the cell, reversing the process.

If a solid electrolyte is not used then a separator is employed. The separator 16 typically is a porous sheet placed between the negative electrode 12 and positive electrode 14 in a liquid electrolyte, a gel electrolyte, or a molten salt battery. The separator 16 functions to prevent physical contact of the positive and negative electrodes 12, 14 while serving as an electrolyte reservoir to enable free ion transport. In some embodiments, the separator 16 may include a microporous membrane and a non-woven cloth. The microporous membrane includes micro-sized voids while the fibers of the non-woven cloth form numerous voids as well. The microporous membrane typically may have a thickness of about 25 μm or less, small pore size less than 1 μm, and porosity of approximately 40%. In one embodiment, the non-woven cloth may have a thickness ranging from about 80-30 μm, large pore size 10-50 μm, and porosity 60-80%.

Both natural and synthetic polymers can be used as the separator material. Natural materials may include cellulose and their chemically modified derivatives. Synthetic polymers include polyolefins, polyvinylidene fluoride, polytetrafluoroethylene, polyamid, polyvinyl alcohol, polyester, polyvinylchloride, nylon, poly(ethylene terephthalate) and the like. The separator 16 itself does not participate in any electrochemical reactions, however its properties affect energy density, power density, and cycle life.

Both the negative electrode 12 and the positive electrode 14 typically include an active material 28 conductive diluents and a binder 30. Both the negative electrode 12 and the positive electrode 14 include materials into which and from which lithium can migrate. The process of lithium moving from the negative electrode 12 and positive electrode 14 is referred to as insertion or intercalation, and the reverse process in which lithium moves out of the negative electrode 12 or positive electrode 14 is referred to as extraction or deintercalation. When the cell is discharging, the lithium spontaneously leaves from the negative electrode 12 and reacts with the positive electrode 14. When the cell is charging, the reverse process occurs: lithium is extracted from the positive electrode 14 and inserted into the negative electrode 12.

A variety of active materials may be utilized in the positive electrode 14 including, but not limited to, cobalt dioxide, nickel-cobalt-manganese, nickel-cobalt-aluminum, magnesium oxide spinel, iron phosphate, manganese phosphate intermetallics of active and inactive components or metal fluorides.

The negative electrode 12 may include, but is not limited to, lithium carbon, silicon, or at metal that alloy with lithium. At least one of the negative electrode 12 or positive electrode 14 may also include electrically conductive microballoons 32 according to one embodiment. The electrically conductive microballoons 32 may include electrically conductive polymers, a polymer with electrically conductive particles therein including, but not limited to, graphite, silicon, or a polymer coating with an electrically conductive material. Electrically conductive polymers may includes, but are not limited to, semi-conducting and metallic "organic" polymers based upon $sp^2$ hybridized linear carbon chains. Examples of electrically conductive polymers include, but are not limited to, poly(acetoyline), poly(puirrole), poly(thiopatene), poly(aniline), poly(fluorine), poly(3-alkylthiophene), poly(tetrathiafulvalene), poly(naphthalene), poly(p-phenylene sulfide), poly(para-phenylene vinylene), and derivatives thereof. Alternatively, insulative polymers may be made electrically conductive by the inclusion of electrically conductive materials such as, but not limited to, particles including graphite, nickel, copper, silver, gold.

In yet another embodiment, the microballoons may be made electrically conductive by depositing a single layer or multiple layers of mono-atomic materials such as platinum, silver, gold, platinum, palladium or ruthenium; or multi-atomic layers thereof. Graphite may also be deposited on the microballoons. In another embodiment, the conductive coating may range from a thickness of 1 atom, or 2 atoms to 10 atoms, or a thickness ranging from about several Angstroms to about several nanometers.

The microballoons may be made by any of a variety of methods. In one case, a polymeric solution may be forced through a needle in an air jet which produces a spray of air filled capsules which may be hardened in a bath, for example, aqueous $CaCl_2$. In another case, co-extrusion of gas and liquid, gas bubbles may be introduced into capsules by means of a triple-barreled head, wherein air is injected in a central capillary tube while a polymeric solution is forced through a larger tube arranged coaxially with the capillary tube, and air is flown around it with a mandrel surrounding the second tube. In yet another case, gas may be trapped in the polymeric solution before spraying, either by using an homogenizer or by sonication. The microballoons produced may have a variety of diameters including, but not limited to, a diameter in the range of 30-100 μm. Exemplary embodiments of electrode binders include, but are not limited to, fluoropolymers such as polyvinylilene fluoride (PFDF).

Figure 2:
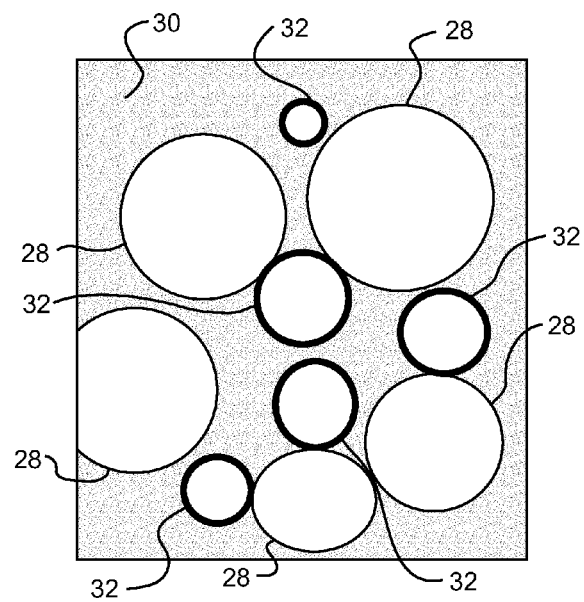
FIG. 2 is a sectional view of a portion of a lithium-ion battery electrode including an active material for storing lithium and a plurality of microballoons in a first configuration according to one exemplary embodiment of the invention.
Figure 3:
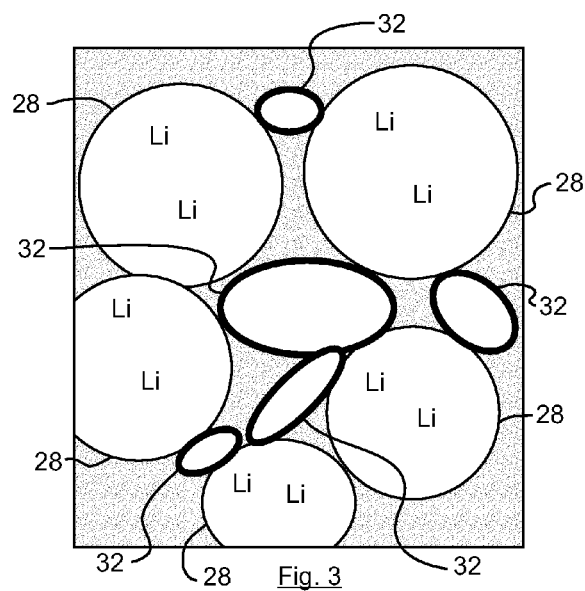
FIG. 3 illustrates the lithium ion battery electrode of FIG. 2 wherein lithium is stored on the active material causing the microballoons to be compressed to a second configuration according to one exemplary embodiment of the invention.
Figure 4:
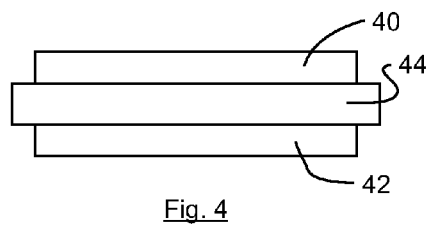
FIG. 4 illustrates a fuel cell electrode membrane assembly with electrodes including microballoons.

Referring now to FIG. 2, at least one of the negative electrode 12 or positive electrode 14 including an active material 28 in a binder 30 may be utilized with microballoons 32. As shown in FIG. 2, when the negative electrode 12 or positive electrode 14 does not include a substantial amount of lithium ion inserted therein, the microballoons have a first configuration or shape in which the microballoons are not compressed. Referring now to FIG. 3, when lithium ion is inserted into the negative electrode or positive electrode with the microballoons 32 therein, the microballoons 32 are sufficiently flexible and become compressed to a second configuration shape to accommodate the insertion of the lithium and so that the negative electrode or positive electrode is not damaged by the insertion of the lithium. When the lithium ions migrate out of the electrode the microballoons 32 are sufficiently resilient to return to the first shape or substantially the first shape. The resiliency of the microballoons may be enhanced by a gas trapped therein. In one embodiment, the active material has a lithium storage capacity much greater than carbon, making the use of the microballoons very advantageous. One such material may include, but is not limited to, silicon whereby the expansion of the silicon particle upon lithium insertion to $Li_{3.75}$ is about 300% whereas the expansion of carbon upon lithium insertion to $Li_{1/16}C$ is 10%.

In one embodiment, the proportional weight range of the microballoons in an electrode 12, 14 including an active material 28 (without Li) in the binder 28 may range from about less than a percent to about several percent. The weight percent of active material 28 (without Li) may range from about greater than 70% to about nearly 100%.

The lithium-ion battery may include an electrolyte liquid or gel. Electrolyte active species may include lithium metal salt in a solvent. Typical lithium salts include, but are not limited to, salts having the formula LiX, where X is an anion such as $ClO_4^-$, $BF_4^-$, $PF_6^-$, $AsF_6^-$, $SbF_6^-$, $CH_3CO_2^-$, $CF_3SO_3^-$, $C(CF_3SO_2)_2^-$, $C(CF_3SO_2)_2^-$ and combinations thereof. Exemplary solvents include, but are not limited to, propylene carbonate (PC), ethylene carbonate (EC), diethyl carbonate (DEC), dimethyl carbonate (DMC), ethyl methyl carbonate (EMC), and γ-butrylactone (GBL). The concentration of lithium salt in electrolyte may range from, but is not limited to, 0.5-1.5 M.

In another application, the electrically conductive microballoons may be included in the negative electrode 40 and/or positive electrode 42 of a fuel cell. Fuel cells which use a membrane 44 that need to be hydrated go through a hydration/drying cycle many times during the life of the fuel cell wherein the membrane positioned adjacent the anode electrode 40 and cathode electrode 42 swells and contracts. This movement can cause the negative electrode 40 and positive electrode 42 to crack. The membrane may become pinched in this crack during subsequent hydration/drying cycle sometimes resulting in pin holes forming on the membrane causing the cell to fail. Inclusion of microballoons may reduce or eliminate electrode crack formation and membrane pinhole formation. The microballoons may be coated with an electrically conductive material. In one embodiment the electrically conductive material may also be a catalyst such as, but not limited to, platinum, palladium or ruthenium. Each of the fuel cell negative electrode 40 or positive electrode 42 may also include an ionomer binder and addition supported or unsupported catalyst.

The above description of embodiments of the invention is merely exemplary in nature and, thus, variations thereof are not to be regarded as a departure from the spirit and scope of the invention.

What is claimed is:

1. A product comprising:
   a first electrode comprising an embedded compressible shape changing component constructed and arranged to reduce in size or change shape to accommodate insertion of lithium into the electrode thereby reducing electrode expansion, wherein the component comprises electrically conductive microballoons.

2. A product as set forth in claim 1 wherein the first electrode further comprises an active material into which and from which lithium ions can migrate.

3. A product as set forth in claim 2 wherein the active material comprises silicon.

4. A product as set forth in claim 2 wherein the active material comprises carbon.

5. A product as set forth in claim 2 wherein the active material comprises at least one of cobalt dioxide, nickel-cobalt-manganese, nickel-cobalt-aluminum, magnesium oxide spinel, iron phosphate, manganese phosphate intermetallics of active and inactive components or fluorides.

6. A product as set forth in claim 1 wherein the electrically conductive microballoons comprise an electrically conductive polymer.

7. A product as set forth in claim 1 wherein the electrically conductive microballoons comprise a polymer and electrically conductive particles dispersed throughout the polymer.

8. A product as set forth in claim 1 wherein the electrically conductive microballoons comprise a polymeric shell and a layer of electrically conductive material over the shell.

9. A product as set forth in claim 8 wherein the electrically conductive layer comprises at least one of graphite, nickel silicon, gold, aluminum, silver, copper, platinum, palladium or ruthenium.

10. A product as set forth in claim 1 wherein the microballoons include a gas trapped therein.

11. A product as set forth in claim 2 wherein microballoons have a first shape when substantially no lithium ions are in the electrode, and wherein the microballoons have a sufficient flexibility so that upon migration of lithium ions into the electrode, the microballoons are compressed to a second shape, and upon migration of lithium ions out of the electrode, the microballoons have a sufficient resilience to return to the first shape or substantial the first shape.

12. A product as set forth in claim 2 further comprising a second electrode.

13. A product as set forth in claim 12 further comprising a porous separator positioned between the first electrode and the second electrode, the porous separator being constructed and arranged to allow lithium ions to travel therethrough and to prevent an electrical connection being made between the first electrode and the second electrode.

14. A product as set forth in claim 13 further comprising an electrolyte to facilitate movement of lithium ions from the first electrode through the porous separator to the second electrode, and from the second electrode through the porous separator to the first electrode.

15. A product as set forth in claim 1 wherein the microballoons comprise a polymeric shell and a catalyst over the shell.

16. A product as set forth in claim 15 wherein the catalyst comprises at least one of platinum, palladium, or ruthenium.

17. A product as set forth in claim 15 further comprising second electrode comprising a catalyst and a proton exchange membrane interposed between the first electrode and the second electrode.

18. A product as set forth in claim 1 further comprising a second electrode, and a proton exchange membrane interposed between the first electrode and the second electrode.

19. A product comprising:
a first electrode comprising an active material comprising at least one of carbon or silicon, and electrically conductive microballoons;
a second electrode, comprising an active material comprising at least one of cobalt dioxide, nickel-cobalt-manganese, nickel-cobalt-aluminum, manganese oxide spinel, iron phosphate, manganese phosphate intermetallics of active and inactive components or metal fluorides, and electrically conductive microballoons;
an insulative porous separator interposed between the first electrode and the second electrode being constructed and arranged to allow passage of lithium ions therethrough;
an electrolyte to facilitate the movement of lithium ions from the first electrode to the second electrode and from the second electrode back to the first electrode;
wherein the electrically conductive microballoons of each of the first electrode and second electrode having a first shape in the electrode when no lithium ions are present in the electrode, and having sufficient flexibility to be compressed upon migration of lithium ions into the electrode, and having sufficient resiliency to return to the first shape upon migration of lithium ions out of the electrode.

* * * * *